US012583188B2

(12) United States Patent
Fuchs

(10) Patent No.: US 12,583,188 B2
(45) Date of Patent: Mar. 24, 2026

(54) CONNECTION METHOD USING A LASER TRANSMISSION BONDING TECHNOLOGY, AN APPARATUS FOR BONDING AS WELL AS A PART MADE OF A LASER TRANSMISSIVE BONDED FIRST PLASTIC PART AND A SECOND PLASTIC PART

(71) Applicant: BRANSON Ultraschall Niederlassung der Emerson Technologies Gmbh & Co. OHG, Dietzenbach (DE)

(72) Inventor: Silvio Fuchs, Hasselroth-Neuenhasslau (DE)

(73) Assignee: BRANSON Ultraschall Niederlassung der Emerson Technologies Gmbh & Co. OHG, Dietzenbach (DE)

( * ) Notice: Subject to any disclaimer, the term of this patent is extended or adjusted under 35 U.S.C. 154(b) by 740 days.

(21) Appl. No.: 17/855,859

(22) Filed: Jul. 1, 2022

(65) Prior Publication Data

US 2023/0065292 A1      Mar. 2, 2023

(30) Foreign Application Priority Data

Aug. 30, 2021 (EP) .................................... 21193722

(51) Int. Cl.
  *B29C 65/16* (2006.01)
  *B29C 65/00* (2006.01)
  *B32B 27/08* (2006.01)
(52) U.S. Cl.
  CPC .......... *B29C 65/1635* (2013.01); *B29C 66/71* (2013.01); *B32B 27/08* (2013.01);
       (Continued)

(58) Field of Classification Search
  CPC .... B29C 65/16; B29C 65/167; B29C 65/1635
  See application file for complete search history.

(56) References Cited

U.S. PATENT DOCUMENTS 6,444,946 B1    9/2002  Korte
7,211,166 B2    5/2007  Chen et al.
       (Continued)

FOREIGN PATENT DOCUMENTS

CN        1810491 A      8/2006
CN      107690385 A      2/2018
       (Continued)

OTHER PUBLICATIONS

KR Office Action for KR Application No. 10-2022-0080306 dated Dec. 3, 2024 (7 pages).
       (Continued)

*Primary Examiner* — Daniel McNally
(74) *Attorney, Agent, or Firm* — Reising Ethington P.C.

(57)        ABSTRACT

A method for connecting first and second plastic parts by a laser transmission bonding wherein the first plastic part absorbs laser light and the second plastic part is made of transparent plastic. The method includes the following steps: positioning the first plastic part in a first tool, positioning the second plastic part in a second tool so that the first plastic part and the second plastic part are spaced from each other thereby preventing mutual heat exchange between the parts, directing laser light through the second plastic part onto a connection zone of the first plastic part whereby the first plastic part is heated at least within the connection zone, after heating the first plastic part, moving the second plastic part into contact with the first plastic part, so that the second plastic part is firmly bonded to the first plastic part.

3 Claims, 3 Drawing Sheets

(52) U.S. Cl.
   CPC ....... *B32B 2250/02* (2013.01); *B32B 2250/24*
   (2013.01); *B32B 2307/732* (2013.01)

(56) References Cited

U.S. PATENT DOCUMENTS

| | | | |
|---|---|---|---|
| 7,591,698 B2 | 9/2009 | Yamazaki et al. | |
| 8,728,268 B2 | 5/2014 | Zaitsu et al. | |
| 2003/0141009 A1* | 7/2003 | Landherr | B29C 65/1687 |
| | | | 156/380.7 |
| 2004/0200569 A1 | 10/2004 | Weiblen et al. | |
| 2005/0218123 A1* | 10/2005 | Hayakawa | B29C 66/53461 |
| | | | 219/121.64 |
| 2011/0298160 A1 | 12/2011 | Zaitsu et al. | |
| 2015/0273808 A1 | 10/2015 | Thompson et al. | |
| 2018/0079142 A1 | 3/2018 | Kinzelmann et al. | |
| 2019/0381742 A1* | 12/2019 | Witte | B29C 66/721 |

FOREIGN PATENT DOCUMENTS

| | | |
|---|---|---|
| DE | 10235892 A1 | 9/2003 |
| DE | 102011107537 A1 | 2/2012 |
| DE | 102016224734 A1 | 6/2018 |
| EP | 0483569 A1 | 5/1992 |
| EP | 1405713 A1 | 4/2004 |
| EP | 1440784 A1 | 7/2004 |
| JP | 2003251699 A | 9/2003 |
| JP | 2004057803 A | 2/2004 |
| JP | 2004074734 A | 3/2004 |
| JP | 2004216839 A | 8/2004 |
| JP | 2005041073 A | 2/2005 |
| JP | 2005301326 A | 10/2005 |
| JP | 2008302700 A | 12/2008 |
| JP | 2012035561 A | 2/2012 |
| JP | 5610138 B2 | 10/2014 |
| KR | 20200110997 A | 9/2020 |
| WO | WO2016143586 A1 | 9/2016 |

OTHER PUBLICATIONS

CN Office Action for CN Application No. 202210768125.3 dated May 28, 2025 (11 pages).
JP Office Action for JP Application No. 2022-096103 dated May 30, 2023 (18 pages).
CN Allowance for CN Application No. 202210768125.3 dated Jan. 7, 2026 (8 pages).

* cited by examiner

CONNECTION METHOD USING A LASER TRANSMISSION BONDING TECHNOLOGY, AN APPARATUS FOR BONDING AS WELL AS A PART MADE OF A LASER TRANSMISSIVE BONDED FIRST PLASTIC PART AND A SECOND PLASTIC PART

CROSS REFERENCE TO RELATED APPLICATIONS

This application claims the priority of European patent application No. EP21193722.2, filed on Aug. 30, 2021, and the content of this priority application is incorporated herein by reference in its entirety.

TECHNICAL FIELD

The present disclosure relates to a connection method for a first and a second plastic part by means of a laser transmission bonding technology. Furthermore, the present disclosure relates to an apparatus for connecting the first and the second plastic parts by the laser transmission bonding technology, as well as to a laser transmissive bonded part made of a connected first and second plastic part.

BACKGROUND

For connecting two plastic parts, transmission welding or laser transmission welding is a commonly used technology. It is also denoted as laser plastic welding, through-transmission welding or polymer welding although the concept to connect two plastic parts is the same. The basic principle of this joining method is passing, or transmitting laser radiation through one piece of plastic to create a weld. Unlike standard welding where the energy is applied at the surface of the materials, transmission welding aims to apply the energy in between two plastic pieces at their interfaces. To this end, the upper plastic part needs to be transparent to the laser light. The lower plastic part is often denoted as an absorber. After the laser light transmission through the transparent or upper first plastic part, the incident light is absorbed by the lower plastic part and transformed into heat within the material. Once the laser light is converted into heat by the absorbing plastic part, the thermal energy is transferred to the transparent plastic part to allow for it to soften and melt. By ensuring the two parts are in intimate contact the heat energy can be conducted to the transparent part. Typically, parts fit well together, but to ensure excellent, consistent contact clamping force is often used.

For the welding of films in the laser transmission method, the join partners are typically pressed against each other in order to bring about a corresponding flow of the polymer melt under the action of heat and thus the welding. During the laser transmission welding of flexible materials, such as e.g. plastic films, the problem arises that the join partners themselves do not have a sufficient rigidity and the contact pressure cannot be conducted onto the weld zone via the join partner itself. For laser transmission welding, therefore, films have to be covered by a pressure tool which produces the corresponding contact pressure at the weld zone. A direct laser radiation would not be possible if the pressure tools were not designed laser-transparent.

Furthermore, welding devices in which the laser light is conducted through a transparent glass ball onto the join partners are also known. The transparent glass ball is housed so that it can roll. The whole device is positioned on the join partners via the glass ball, with the result that the contact pressure is exerted directly onto the weld zone through the glass ball. The device can be moved/shifted by rolling on the glass ball, with the result that pre-determined contours can be travelled and welded. A disadvantage of the earlier system is that this device is relatively inert due to its high weight, and it is ill-suited to the welding of relatively light assembly parts, e.g. films and injection-moulded parts.

EP 1 405 713 describes a known device for welding by means of a rollably housed glass ball. The glass ball is housed in a shaft which is mechanically decoupled from the rest of the device by a spring. In this system, the decoupled part with the glass ball is too inert to be able to carry out a contour welding on a cassette module. Because of the inert construction, the glass ball cannot follow unevennesses on the join partners in the contour shape without making micro-jumps.

EP 1 440 784 describes a device with a transparent glass ball which is housed in a shaft part. A hot gas stream which is conducted past the sides of the glass ball pre-heats the assembly parts. As the glass ball is housed in a larger device, the device has a high inertia. The high masses and inertias of the processing heads of known welding devices and the glass fiber coupling-in of the laser light used result in welding processes with relatively high contact pressure that cannot be adjusted as desired, a low dynamic and a slow response.

According to U.S. Pat. No. 6,444,946, only one or both of the joint faces is/are entirely preheated to an intermediate temperature slightly below the working or melting temperature. Thereafter, the joint faces are brought into mutual contact and the entire preheated joint face is heated to the final melting temperature. The melt or melting mass then heats the other joint face simultaneously over the entire seam length and up to the melting temperature. This results in the melt mass of the two joint zones intermingling homogeneously and solidifying on cooling to a solid weld. This prevents the melts from solidifying in some seam area before both joint zones of all other seam areas have attained the melting temperature, namely are fused together. All seam areas melt nearly simultaneously, or each seam area fuses as long as all remaining seam areas are still soft enough to allow the components to be mutually moved so that the softened material is able to yield or be displaced. The seam melt solidifies over the full length and width of the seam simultaneously or practically at the same time thus also avoiding strains to rise.

The above process requires expensive optical constructions for guiding, focusing and timely adjusting the laser light penetrating and pre-heating the contacting plastic parts to be connected to an intermediate temperature slightly below the working or melting temperature. Furthermore, the combination of a pre-heating and a subsequent melting of the plastic material needs several interrelated steps and the respective time for execution.

It is therefore the object of at least some implementations of the present disclosure to present an alternative connection method for at least two plastic parts being less extensive as the known methods, in particular a method to connect a plastic part and a plastic film.

SUMMARY

The above object is solved by a connection method for connecting a first plastic part and a second plastic part to each other by means of a laser transmission bonding technology, an apparatus for connecting the first plastic part and at least one second plastic part by means of the laser transmission bonding technology, and a part made of the first plastic part and at least one second plastic part. Further developments as well as advantages and modifications of the disclosure are described in the following description, the accompanying drawings and the pending claims.

The present disclosure includes a connection method for connecting a first plastic part and at least one second plastic part to each other by means of a laser transmission bonding technology. The first plastic part absorbs laser light and the second plastic part is made of transparent plastic, which may be a plastic film. The connection method comprises the following steps: S1 positioning the first plastic part in a first tool, S2 positioning the second plastic part in a second tool so that the first plastic part retained by the first tool and the second plastic part retained by the second tool are spaced apart from each other thereby preventing mutual heat exchange between the first and the second plastic parts, S3 directing laser light through the second plastic part onto a connection zone of the first plastic part whereby the first plastic part is heated at least within the connection zone, the material of the first plastic part may be melted in the connection zone, and S4 after heating the first plastic part, moving the second plastic part into contact with the first plastic part, which may be by pushing the second plastic part against the first plastic part, so that the second plastic part may be firmly bonded to the first plastic part.

The present laser transmission bonding technology is based on known laser transmission welding procedures. In contrast to known procedures, the plastic parts to be connected are spaced apart from each other while laser light heats the absorbing first plastic part. To this end, laser light may be directed to a later connection zone which does not cover the complete first plastic part. In this context only the connection zone may be made of an absorbing plastic material to transform the incident light into heat. Based on this embodiment, the first plastic part may be made of an arbitrary choice of plastic material or non-plastic material, if also the connection zone is made of a light absorbing and heat-generating material.

Based on the present procedure, the first plastic part only is heated by the incident laser light. The heat may melt the plastic material within the connection zone, and thereby stores heat within the connection zone. The heat is used later on for making the connection between the first absorbing plastic part and the at least one second plastic part. While heating the first plastic part, the first and the second plastic part are retained within a respective first and second tool. These tools are movable with respect to each other. Thus, the first and the second plastic parts can be brought into contact with each other to generate a connection therebetween.

After heating the first plastic part and melting the material within the connection zone, thermal energy may be stored within the connection zone. The stored thermal energy is partially transferred to the second plastic part after the second plastic part was pushed against the first plastic part for connecting both plastic parts. The amount of thermal energy is sufficiently high in order to create a connection between both parts.

The first and the second plastic part may be firmly bonded to each other. If the thermal energy stored in the connection zone of the absorbing plastic part is sufficiently high, the bonding between the first and the second plastic part is similar to a transmission weld connection.

Further, the thermal energy stored within the connection zone of the first plastic part may also enable the melting of the material of the second plastic part contacting the connection zone of the first plastic part.

While pushing the first and the second plastic part against each other, the fused plastic material of the first and/or the second plastic part solidifies and bonds both parts to each other.

According to a further embodiment of the method, the connection method comprises the further step: switching off the laser light after heating up the first plastic part and pushing the second plastic part against the first plastic part while no light enters the first plastic part.

According to different embodiments of the present bonding method, the first plastic part is exposed to laser light only while the first and the second part are spaced apart from each other. The spacing is sufficiently large to reduce or prevent heat transfer between both plastic parts. Based thereon, the absorbing plastic part is heated individually. This bonding approach may be used for connecting an absorbing first plastic part and a plastic film, either transparent or non-transparent.

After the laser light source had been switched off, the first and the second plastic part are pushed against each other, and the fused material of the first part solidifies. While contacting the first and the second plastic part, no laser light is exposed onto the connection zone.

According to an alternative embodiment, the connection method comprises the further step: pushing the second plastic part against the first plastic part while laser light is directed through the second plastic part onto the connection zone at the same time.

According to this embodiment, laser light may penetrate the second plastic part. The first plastic part absorbs the laser energy and transfers the energy to the second part, film or membrane by heat conduction. At the same time, both parts are pushed against each other. Thereby, additional thermal energy is generated within the connection zone by the light absorbing material property of the first plastic part.

According to a further embodiment of the connection method, the laser light may be directed to the connection zone in at least two stages in step S3 in which (a) a first stage has a laser light intensity so that the first plastic part is heated and/or plasticized to support a shape adaptation of the first plastic part for tolerance compensation, and/or (b) the laser light intensity is adapted in a second stage so that the material of the first plastic part is melted within the connection zone of the first plastic part.

According to different bonding strategies, the laser light intensity of the laser light incident to the connection zone may be varied. In a first approach, the laser light intensity generates an amount of thermal energy in the first plastic part which enables a shape adaptation of the first part for tolerance compensation. Consequently, the provided thermal energy softens or plasticizes the plastic material to this end.

Based on a second approach, a higher amount of thermal energy may be generated within the connection zone of the first absorbing plastic part according to the laser light exposure. The generated thermal energy due to light absorption melts the material within the connection zone at least partially. Thereby, the contact to the second plastic part and the respective thermal energy transfer is facilitated. The molten material of the first plastic part wets the surface of the second plastic part so that the ponding interface may be enlarged.

As a further alternative, the first plastic part is made of any kind of thermoplastic material.

Additionally, the second plastic part may be a plastic film made of thermoplastic material.

The present disclosure also includes an apparatus for connecting a first plastic part and at least one second plastic part by means of a laser transmission bonding technology, which has the following features: a first tool adapted for retaining the first plastic part made of light absorbing material, a second tool adapted for retaining a second plastic part being a plastic film, a laser light source adapted to direct laser light through the second plastic part onto the first plastic part so that the first plastic part is heated by the laser light and a moving construction adapted to move the first and the second tool relative to each other to push the second plastic part against the heated first plastic part.

Tools for laser welding or laser bonding are well-known. They have a first and a second tool for retaining and moving the first and the second plastic part, respectively. The second tool is adapted to retain a plastic film. Furthermore, the first and second tool are adapted to carry out a bonding movement by means of which the first and the second plastic parts are pushed against each other. Furthermore, the apparatus maintains the pushing contact between the plastic parts until the bonding between the first and the second plastic part is completed.

A laser transmissive film or a part may be fixed by a mechanical device or vacuum in the laser tool. The plastic film or part can be positioned on top of the absorbent part and transferred into the other tool or can be manually loaded into the upper tool or will be inserted by a transfer system. The tool where the absorbent part is fixed or positioned is fixed on a machine axis table.

According to an embodiment of the apparatus, the laser light source may be switched on and off in a defined manner so that the first and the second plastic parts are pushed against each other with laser light entering the second plastic part at the same time or with no laser light entering the second plastic part at the same time.

Furthermore, the disclosure includes a bonded part made of a first plastic part and at least one second plastic part wherein the second plastic part is a plastic film having a thickness in the range of 10 μm to 10 mm and the first plastic part and the at least one second plastic part are connected by means of a laser transmission bonding technology.

BRIEF DESCRIPTION OF THE DRAWINGS

The embodiments of the present disclosure are described in detail with respect to the accompanying drawing. It shows.

DETAILED DESCRIPTION

Figure 1:
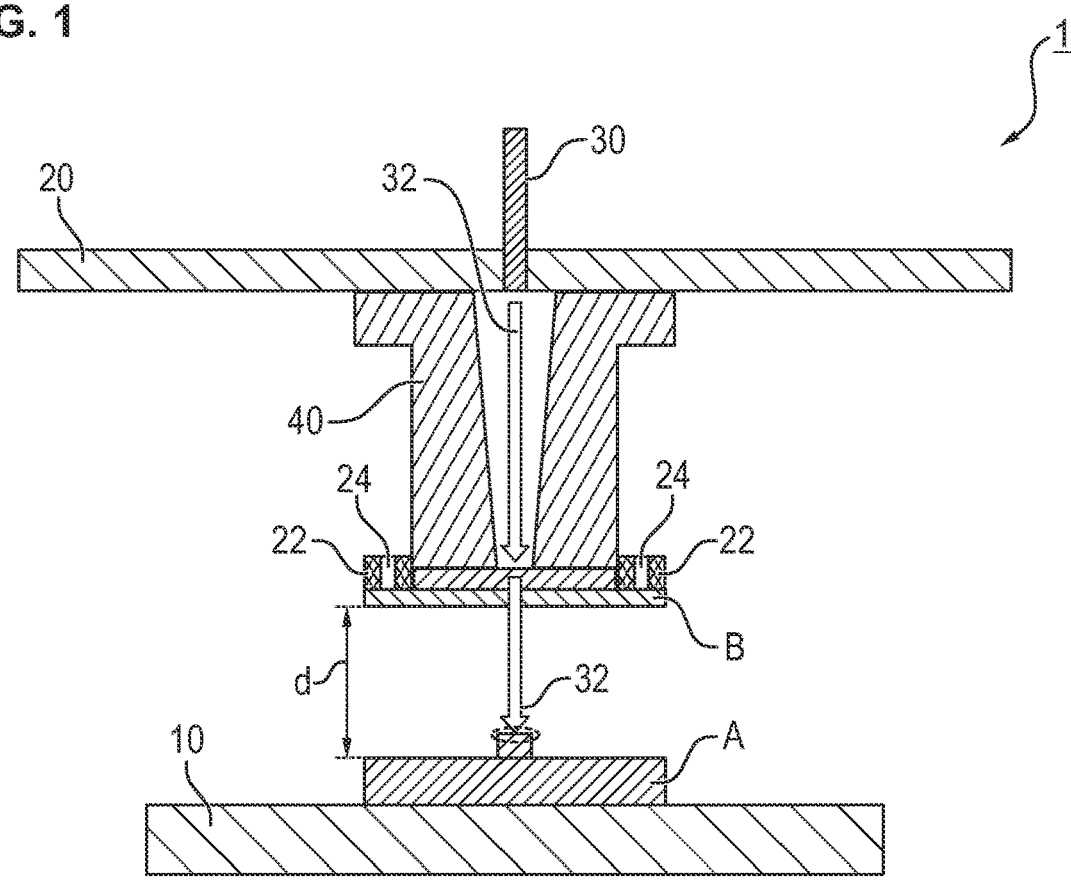
FIG. 1 an embodiment of the apparatus for laser transmission bonding of a first and a second plastic part in which the first end and the second plastic parts are spaced apart to each other, FIG. 2 the apparatus of FIG. 1 in which the first and the second plastic parts are in bonding contact by pushing the first and the second plastic part against each other.

FIG. 1 shows an embodiment of an apparatus 1 for connecting a first plastic part A and at least one second plastic part B. The first plastic part A is adapted to absorb light, in particular laser light. The absorbed laser light is transformed into thermal energy within the plastic material of the first plastic part A. Therefore, the first plastic part A is also denoted as an absorber.

Typical material examples for plastic laser light absorbing material are thermoplastic materials or the like adapted for laser transmission welding.

The second plastic part B may be made of a transparent plastic material. The transparency of the second plastic part is used to direct laser light through the second plastic part B onto the first absorbing plastic part A.

According to an embodiment of the second plastic part B, it may be made of a plastic film. The plastic film may have a thickness in the range of 10 μm to 10 mm.

According to a further embodiment of the material choice of the second plastic part B, it may be made of a non-transparent plastic film. The non-transparent plastic film B may have a thickness in the range of 10 μm to 10 mm.

Furthermore, the above mentioned transparent film may have different physical properties. According to one alternative, the film may constitute a membrane. A membrane allows for a transport of material and/or energy through the membrane or through individual parts of the membrane. Additionally, the membrane is used to separate certain parts or substances from each other. According to another embodiment of the film, the membrane may be adapted to transform or absorb or transfer energy or forces acting onto the film or membrane.

If a non-transparent plastic film B is used as the second plastic part, the first plastic part A will be exposed to laser light with no second non-transparent plastic part positioned on top of the first plastic part A or within the laser light beam directed onto the absorber A. Accordingly, thermal heat will be stored in the first plastic part A in a similar way as in a laser transmission welding procedure. After the laser light has heated the first plastic part A in a preferred connection zone 50, the non-transparent film may be used as the second plastic part B will be pushed against the first plastic part A. The fused plastic material of the connection zone 50 in the first plastic part A may bond to the non-transparent plastic film to form a connection between the first A and the second plastic part B. To this end, the fused material of the connection zone 50 of the first plastic part A solidifies in close contact to the second plastic part B.

Figure 2:
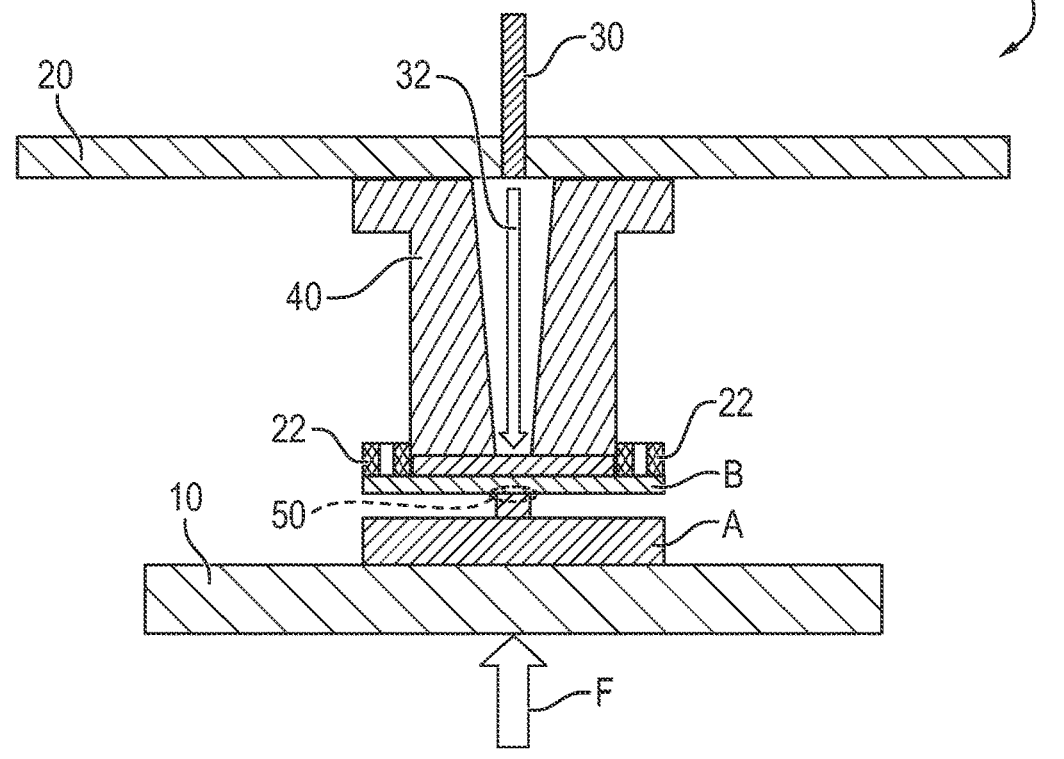

As shown in FIGS. 1 and 2, the first plastic part A is retained by a first tool 10. Within the first tool 10, the first plastic part A is clamped, mounted, held by vacuum or releasably fixed according to known techniques.

The second plastic part B is retained by a second tool 20. According to an embodiment of the second tool 20, a vacuum holder may be provided holding the second plastic part B. To this end, the second tool 20 may have several suction heads 22. The suction heads 22 generate a vacuum on a respective opening 24. The second plastic part B is placed over this opening 24 and blocks the opening 24. Thereby, the second plastic part B is releasably retained by the second tool 20.

Further, a laser light source 30 is mounted on the second tool 20. The laser light source 30 denotes any qualified light construction to guide light to the second tool 20. Thus, the laser light source 30 may comprise a fiber bundle, a laser bank (not shown), at least one laser diode of brick is (not shown), individual light guides or the like.

The laser light source 30 may provide laser light 32 which may be directed through a waveguide 40 to the first plastic part A. The laser light 32 may be focused by the waveguide 40 to the connection zone 50 of the first plastic part A or absorber A.

After the first plastic part A is positioned in and retained by the first tool 10, and the second plastic part B is positioned in and retained by the second tool 20 (see steps S1 and S2, FIG. 3), the first part A and the second part B are positioned in a certain distance d to each other (see FIG. 1). The distance d may be large enough to prevent heat transfer between both plastic parts A, B. In spite of the distance d, the plastic retained parts A, B are oriented in such a way to each other that the laser light 32 exiting the waveguide 40 may meet the connection zone 50 of the first plastic part A. Due to the laser light 32 absorbed by the plastic material within the connection zone 50, the material of the connection zone 50 is heated or fused dependent on the intensity of the laser light 32. It has to be noted that the second plastic part B is a transparent plastic part B or a transparent or a non-transparent plastic film B.

The heated material within the connection zone 50, either it is fused or softened, is thereby enabled for shape adaptation of the first plastic part A. The shape adaptation or tolerance compensation will be used when the first plastic part A and the second plastic part B are moved into contact with each other. The first plastic part A and the second plastic part B may be pushed against each other until the material within the connection zone 50 has solidified. (Step S4).

The material of the first plastic part A within the connection zone 50 may be heated while the first plastic part A and the second plastic part B are arranged at the distance d from each other. Before reducing the distance d and pushing the first plastic part A and the second plastic part B against each other, the laser light 32 heating the material in the connection zone 50 is switched off. The plastic parts A, B are pushed against each other and held in close contact so that the first plastic part A bonds to the second plastic part B within the connection zone 50.

According to another embodiment, the laser light exposure of the connection zone 50 may be continued while the first plastic part A and the second plastic part B are pushed against each other. After a certain time of contact between parts A, B the laser light 32 is switched off and the plastic material within the connection zone 50 solidifies. In this bonding alternative, the second plastic part B is transparent.

For realizing the movement of the first 10 and the second tool 20 relative to each other, electric or pneumatic or hydraulic moving means are provided. Such constructions are generally known in the art.

Figures 3A, 3B:
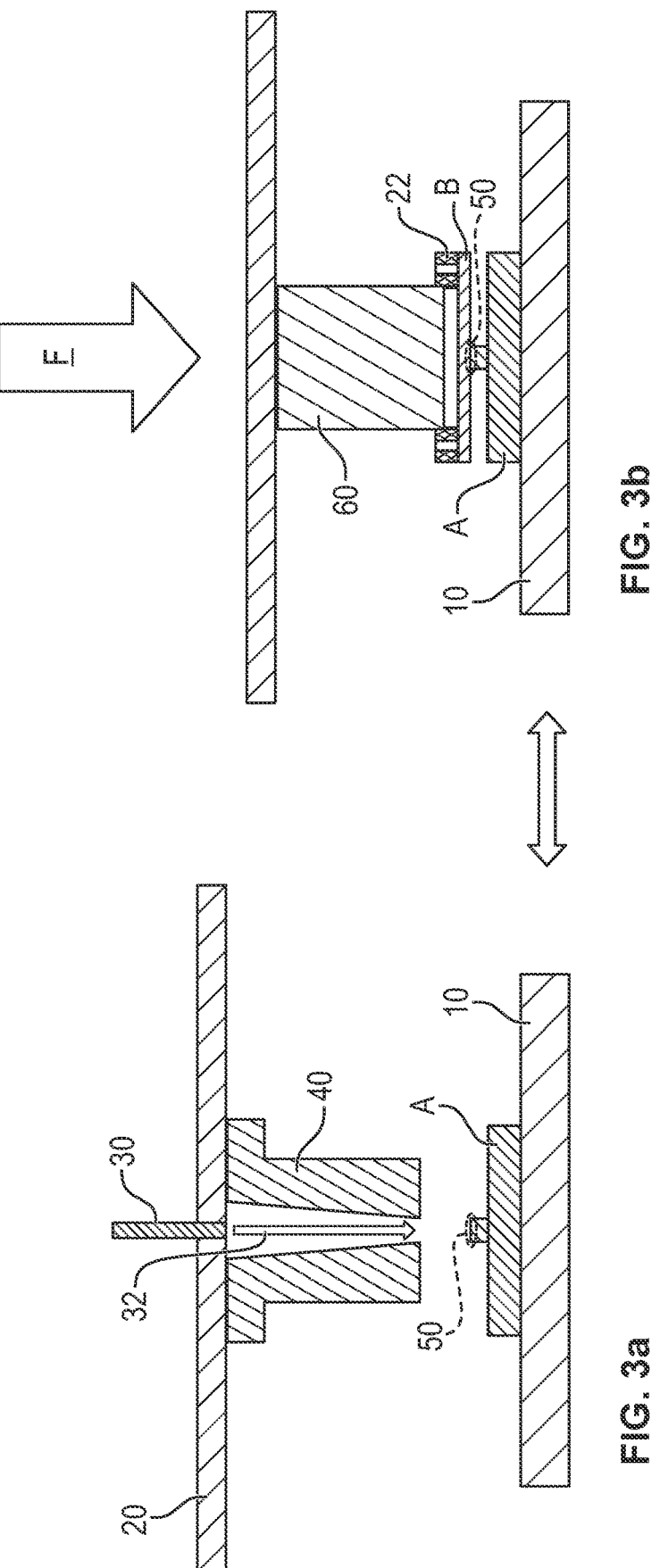
FIGS. 3a and 3b are embodiments of the apparatus for laser transmission bonding of a first and a second plastic part in which the lower tool bearing the absorptive part may be laterally movable between a heating position and a joining position with a transparent second part, and FIG. 4 a flowchart of an embodiment of the connection method for connecting the first and the second plastic part by laser transmission bonding to each other.
Figure 4:
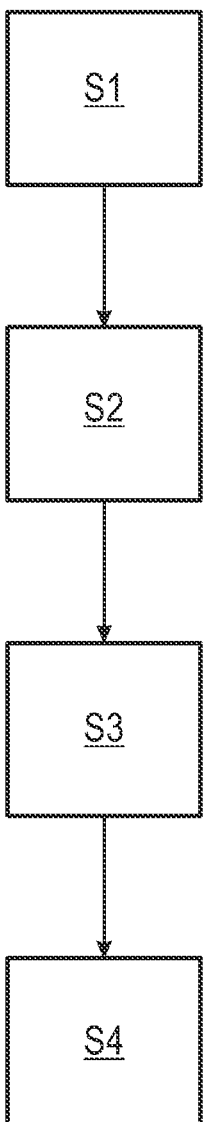

According to a further embodiment as exemplarily shown in FIG. 3, the material of the first plastic part A within the connection zone 50 may be heated by the laser light 32 while the first plastic part A is arranged below the laser light source, e.g. the exit end of the waveguide 40. The second plastic part B to be connected with the heated plastic part A is arranged at a remote location (see FIG. 3*a*). This arrangement allows for an individual preparation of the parts to be connected. This may be helpful, the parts A and B require different environmental conditions like temperature, humidity, radiation the like. Furthermore, the part B may be protected from ambient or corrosive impacts while heating part A.

After part A was sufficiently heated within the connection zone 50, the heated part A is moved relative to part B. The relative movement of the parts A and B is indicated by the motion arrow in FIG. 3*b*). The movement either of part A (as shown), or of part A and B, or of part B only is carried out by known driving techniques, e.g. electric, pneumatic or hydraulic drives. Furthermore, the movement of the parts A, B is realized on a linear or a curvilinear path or a combination thereof.

After the above part movement is completed, part A and part B are arranged in a joining position as shown in FIG. 3*c*). In this arrangement, the second part B may be retained by a vacuum source or the like at an upper tool 60. For joining parts A and B together, the parts A and B are relatively moved to contact each other in the connection zone 50. This movement may be carried out by the upper tool 60. During contact of parts A and B within the connection zone 50, the parts A and B are joined or bonded to each other.

The thermal energy stored in the connection zone 50 is sufficient to create a reliable connection or bonding between the first and the second plastic parts A, B.

According to a further embodiment, the second plastic part B is a plastic film. The plastic film has a thickness in the range of 10 μm to 10 mm.

Furthermore, the plastic film may be made of a thermoplastic material.

Dependent on the light intensity used to expose the connection zone 50, the plastic material of the first plastic part A is heated or plasticized, or it is fused within the connection zone 50. Based on the laser light treatment, the thermal energy stored within the material of the connection zone 50 is sufficient for bonding the plastic film B to the first plastic part A. In at least some implementations, it is preferred to switch of the laser light 32 before contacting and bonding the first plastic part A and the plastic film B.

Based on the above bonding method, a bonded part is produced from a first plastic part A and a second plastic part B, which may be a plastic film as defined above.

The invention claimed is:

1. A connection method for connecting a first plastic part and a second plastic part to each other by means of a laser transmission bonding technology wherein the first plastic part absorbs laser light and the second plastic part is made of transparent plastic, wherein the second plastic part is a plastic film having a thickness in the range of 10 μm to 10 mm and the connection method comprises the following steps:

S1 positioning of the first plastic part in a first tool,

S2 positioning of the second plastic part in a second tool so that the first plastic part retained by the first tool and the second plastic part retained by the second tool are spaced apart from each other thereby preventing mutual heat exchange between the first and the second plastic parts, S3 directing laser light through the second plastic part onto a connection zone of the first plastic part whereby the first plastic part is heated at least within the connection zone, S4 after heating the first plastic part, moving the second plastic part into contact with the first plastic part, so that the second plastic part is firmly bonded to the first plastic part, and switching off the laser light after heating up the first plastic part and pushing the second plastic part against the first plastic part while no light enters the first plastic part.

2. The connection method according to claim 1, wherein the laser light is directed to the connection zone in at least two stages in step S3 in which (a) a first stage has a laser light intensity so that the first plastic part is heated up and/or plasticized to support a shape adaptation of the first plastic part for tolerance compensation, and (b) the laser light intensity is adapted in a second stage so that the material of the first plastic part is melted within the connection zone of the first plastic part.

3. The connection method according to claim 1, in which the first plastic part is made of thermoplastic material.

* * * * *